Nov. 23, 1926.
J. P. DALES
1,607,608
AUTOMOBILE LOCK
Filed Dec. 9, 1921    2 Sheets-Sheet 1
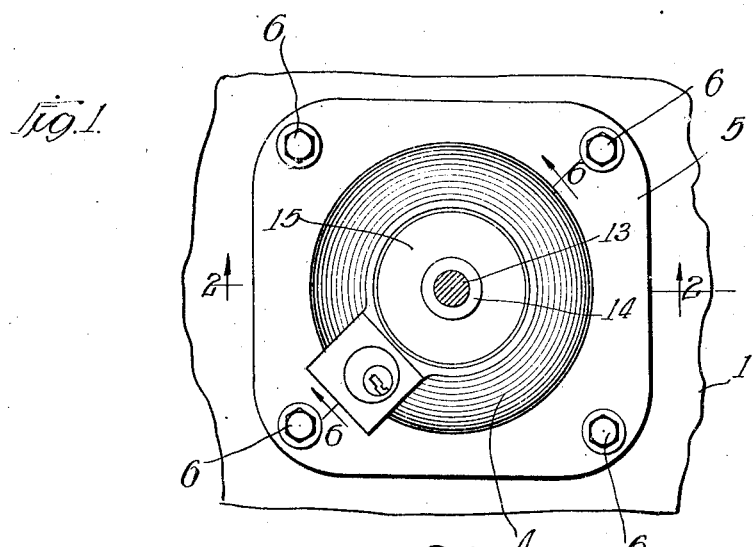
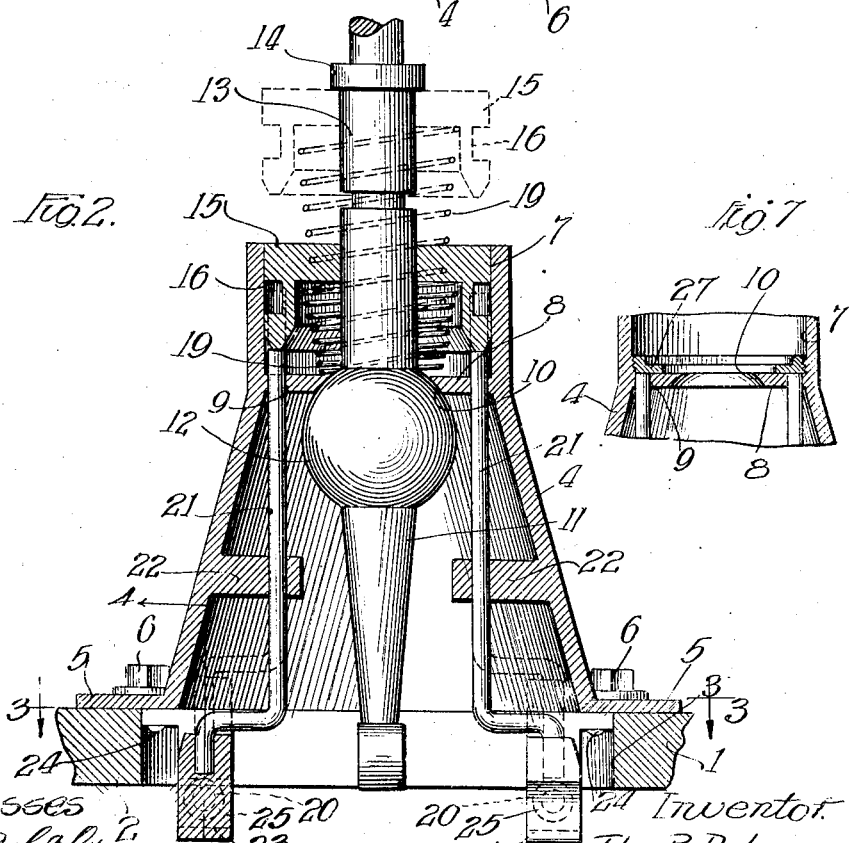
Witnesses
Inventor
John P. Dales
By Stice & Stice Attys.

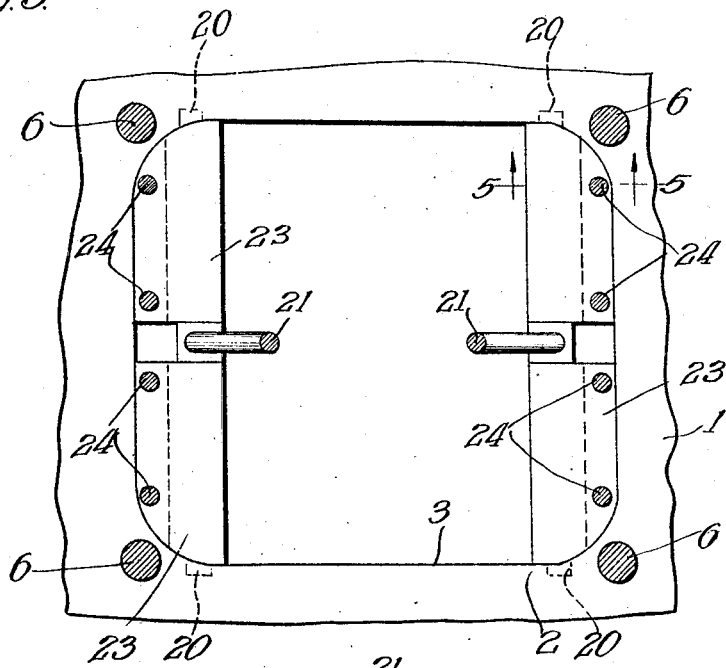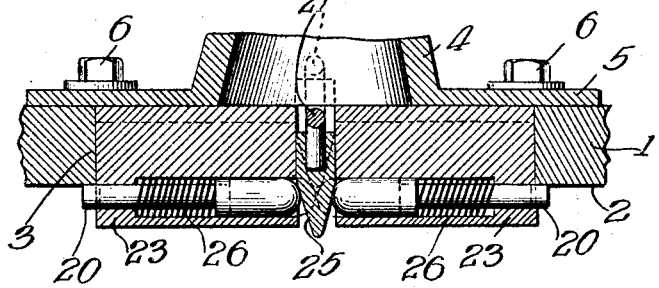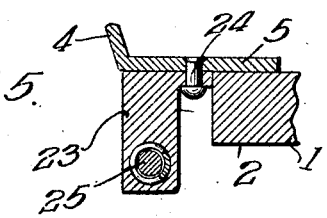

Patented Nov. 23, 1926.

1,607,608

UNITED STATES PATENT OFFICE.

JOHN P. DALES, OF CHICAGO, ILLINOIS, ASSIGNOR OF ONE-HALF TO ISIDORE J. SCHILLER, OF CHICAGO, ILLINOIS.

AUTOMOBILE LOCK.

Application filed December 9, 1921. Serial No. 521,133.

My device relates to improvements in automobile locks, and more particularly to means for locking the gear shift lever mounting to the transmission housing or casing. Another object of my invention is to provide means for locking the gear shift lever in neutral position and arranged so as to be cooperable with said means for locking the gear shift lever mounting to the transmission casing, so that the operation of locking the gear shift lever in neutral, will at the same time control the first-mentioned locking means.

Ordinarily, where only the gear shift lever is locked and there is no provision made for locking the gear shift lever mounting to the transmission casing, and the bolts or fastening means for holding the casing and mounting together may be unscrewed, cut or otherwise removed to provide access to the gears, which may be then moved or shifted by tool or by hand. With my invention not only is the gear shift lever locked in neutral, but the gear shift lever mounting is locked to the gear casing, as will be more clearly hereinafter shown.

The invention has among its further objects the production of a device of the kind described that is simple, convenient, durable, reliable, compact, efficient and satisfactory for use wherever found applicable. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts—

Fig. 1 is a top plan view of my device;

Fig. 2 is a section taken substantially on the line 2—2 of Fig. 1;

Fig. 3 is a plan view taken substantially on the line 3—3 of Fig. 2;

Fig. 4 is a sectional view taken substantially on the line 4—4 of Fig. 2;

Fig. 5 is a fragmentary section taken substantially on the line 5—5 of Fig. 3;

Fig. 6 is a fragmentary section taken substantially on the line 6—6 of Fig. 1; and Fig. 7 is a sectional view showing a modified form of locking means.

In the drawings, wherein I have shown the preferred embodiment of my invention, 1 represents the upper wall of the transmission housing or casing, in which are arranged the transmission gears, the inner wall of the transmission housing being indicated at 2. An aperture or opening 3 is provided in the wall of the housing adjacent the shift lever and the mounting therefor, which in the case illustrated forms a closure for the same. The gear shift lever mounting 4 illustrated has a base flange 5 which fits over the edge of opening 3 in the casing, and may be secured thereto by bolts, rivets or other suitable fastening means 6.

The upper portion of the mounting shown has a chamber or recess 7 therein with a bottom wall or web member 8, provided with one or more apertures 9 therethrough to receive rods, as will be more clearly hereinafter described, and also provided with a central partly spherical bearing 10 to receive the ball portion 12 of the shift lever. The location of the bearing depends on whether the ball portion is below or above the web 8.

The lower portion 11 of the shift lever projects into engagement with the gear mechanism, not shown, and the upper portion or shank 13 projects outwardly beyond the mounting so that it may be manually controlled. Any suitable shift lever locking mechanism may be employed. As illustrated, a collar 14 is provided on the shank portion 13 above the top of the mounting 4 to provide a stop or abutment for a sleeve 15 slidably mounted on the shank 13 so as to be movable laterally thereof, and having an annular peripheral recess 16 therein. The sleeve 15 is of a diameter to neatly fit within the recess 7, but having substantially no lateral play therein.

A spring-pressed key or the like controlled plunger is carried by the mounting 4 at its upper end, as by an offset chambered portion 18, said plunger being engageable with the annular recess 16 of the sleeve 15 to lock said lever in neutral position.

A spring 19 is arranged between the web 8 and the inner wall of the sleeve 15, and tends to normally press said sleeve outwardly of the chamber 7 to the position shown in dotted lines in Fig. 2.

It will be seen that when the sleeve is in the position shown in dotted lines in Fig. 2, the gear shift lever will have a universal movement, permitting the gears to be shifted, but that when the sleeve 15 is seated within the chamber 7, as shown in full lines, it will lock the gear shift lever against lateral movement, and prevent any gear shifting.

The locking of the gear shift lever alone would not prevent access to the gears, because by removing the bolts 6, the mounting could be shifted to one side for exposing the gears so that they may be moved by tool or by hand, so that the motor vehicle could be operated. In order to overcome this serious fault, I have provided locking members 20 carried by the mounting 4 and engageable with the inner wall surface 2 of the transmission housing 1, so that the mounting cannot be shifted laterally or removed simply by the removal of the bolts 6. The locking bars 20 may be operated simultaneously with the locking of the shift lever in neutral, or may be operated independently therefrom, as desired.

In Fig. 2 the locking bars 20 are operated simultaneously with the locking of the shift lever, and for this purpose there is provided one or more bars 21 slidably movable through the apertures 9 of the web 8 and engageable at their upper ends with the sleeve 15, as shown. A guide 22 positioned inwardly of the mounting 4 is shown for slidably receiving the rod 21 and holding it in its proper position.

The locking bars 20, or their equivalents, are slidably or movably carried by transverse portions 23 extending inwardly of the opening 3, either integral with the housing 4 or of a separate part therefrom and secured thereto by rivets 24, as desired.

Intermediate the operating lever or bar 21 and the locking bars 20, are arranged any suitable connecting means, as for instance, toggle links, racks and pinions, or the like. In the present instance there is shown a tapered member 25 carried by the lower ends of the members 21 and slidably engageable with the inner adjacent ends of the locking bars 20, as shown more clearly in Fig. 4, so that when the bars 21 are moved downwardly, the tapered or wedge portions 25 will move the locking bars 20 outwardly in unison to engage with the under surface 2 of the transmission housing 1. Springs 26 are arranged in the recesses in the portions 23 through which the locking bars move, to release said locking bars from locking engagement with the housing when the operating levers 21 are moved to inoperative position. Any equivalent mechanisms may be employed for the purpose.

From the above explanation it will be seen that whenever the sleeve 15 is moved to its locking position, as shown in Fig. 2, the locking bars 20 will be simultaneously actuated thereby into locking engagement with the transmission casing to hold the gear shift lever mounting locked thereto.

In Fig. 7 there is shown a modified form of locking means, wherein the locking bars do not release from the housing at each unlocking of the gear shift lever, but constantly hold the gear shift lever mounting locked to the transmission casing for any desired periods of time, but may be released or disengaged therefrom if desired. An annulus 27 is suitably detachably secured in place, as shown it is preferably threaded on its exterior, and the mounting 4 is cooperably threaded to receive the annulus 27 so that when the annulus 27 is moved by a spanner wrench or any other suitable device to the position shown in Fig. 7, it will move or slide the operating bars 21 downwardly to operate the locking bars 20 and maintain them in locking position. With either construction illustrated, the housing or mounting of the shift lever is secured or locked in place, so that it cannot be removed by an unauthorized person, but may at any time be removed by the user or his repair man.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In combination with a transmission housing and a cover therefor, a gear shift lever carried by said cover, key-controlled means including a member carried by said lever for locking said lever against movement, and means independent of said lever and operable by said key-controlled means simultaneously with the locking thereof for locking said housing to said cover.

2. The combination with a transmission housing, a gear shift lever mounting cooperating therewith, a gear shift lever carried by said mounting, means including a member carried by said shift lever for locking said shift lever, and means operable by said locking means for locking said mounting to said housing.

3. In a device of the kind described and in combination, a transmission housing, a gear shift lever mounting therefor, a sleeve movable on said shift lever and cooperable with said mounting to lock said lever in neutral, and means controlled by said sleeve for locking said mounting to said casing.

4. In a device of the kind described and in combination, a transmission casing, a gear shift lever mounting therefor, a sleeve movably mounted on said shift lever and cooperable with said mounting to lock said lever in neutral, key-controlled means for releasably locking said sleeve to hold said lever in neutral, and means controlled by said sleeve for locking said mounting to said casing in unison with the locking of said lever.

5. In a device of the kind described and in combination, a transmission casing, a gear shift lever mounting therefor, a sleeve movable on said shift lever and cooperable with the mounting to lock the lever in neutral, and means controlled by said sleeve for locking said mounting to said casing simultaneously with the locking of said lever, said means comprising a locking bar on said mounting engageable with said casing, and a locking bar operating rod movably engageable with said sleeve.

6. In a device of the kind described and in combination, a transmission casing, a gear shift lever mounting cooperable therewith, a sleeve movably mounted on said shift lever and cooperable with said mounting to lock said lever in neutral, and means controlled by said sleeve operable simultaneous with the locking thereof for locking said mounting to said casing, said means comprising a locking bar carried by said mounting and engageable with said casing, and a locking-bar operating rod slidably carried by said mounting and movably engageable with said sleeve to operate said locking bar.

7. In a device of the kind described and in combination, a transmission casing, a gear shift lever mounting therefor, a plurality of locking bars movably carried by said mounting and engageable with the inner wall of said casing, a slidable bar operably controlling all of said locking bars in unison, a member slidable on said shift lever to control said slidable bar, and key-controlled means for locking said last-mentioned member to hold said lever in neutral.

In testimony whereof, I have hereunto signed my name.

JOHN P. DALES.